(12) United States Patent
Ishibashi et al.

(10) Patent No.: US 11,655,877 B2
(45) Date of Patent: May 23, 2023

(54) TORSIONAL VIBRATION DAMPER AND MANUFACTURING METHOD THEREOF

(71) Applicant: Toyota Jidosha Kabushiki Kaisha, Toyota (JP)

(72) Inventors: Masayuki Ishibashi, Numazu (JP); Yu Shiraishi, Susono (JP); Hiroyuki Amano, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/455,299

(22) Filed: Nov. 17, 2021

(65) Prior Publication Data
US 2022/0186811 A1 Jun. 16, 2022

(30) Foreign Application Priority Data
Dec. 10, 2020 (JP) .............................. JP2020-204714

(51) Int. Cl.
*F16F 15/14* (2006.01)

(52) U.S. Cl.
CPC ........ *F16F 15/145* (2013.01); *F16F 2222/08* (2013.01); *F16F 2232/02* (2013.01); *F16F 2236/08* (2013.01)

(58) Field of Classification Search
CPC .................................................. F16F 2236/08
See application file for complete search history.

(56) References Cited

U.S. PATENT DOCUMENTS

| 5,139,122 A | * | 8/1992 | Maeda | F16H 45/02 |
| | | | | 464/68.7 |
| 10,816,058 B2 | * | 10/2020 | Ishibashi | F16F 15/1457 |
| 2002/0179205 A1 | | 12/2002 | Ohbayashi et al. | |
| 2017/0234401 A1 | * | 8/2017 | Horita | F16F 15/145 |
| | | | | 74/572.21 |
| 2021/0164536 A1 | * | 6/2021 | Nakamura | F16F 15/1457 |

FOREIGN PATENT DOCUMENTS

JP 2002-349682 A 12/2002

* cited by examiner

*Primary Examiner* — Vicky A Johnson
(74) *Attorney, Agent, or Firm* — Oblon, McClelland, Maier & Neustadt, L.L.P.

(57) ABSTRACT

A torsional vibration damper having improved abrasion resistance at a portion of a rotary member to which a rolling mass is contacted, and a manufacturing method thereof. The torsional vibration damper comprises: a rotary member; an inertia body oscillating around the rotary member; and a retainer formed on the rotary member to hold a rolling mass between a pair of stoppers. A hardness of an inner surface of at least one of the stoppers is increased higher in a radially outer portion than in a radially inner portion, within a reciprocating range of the rolling mass.

11 Claims, 10 Drawing Sheets

[HIGH-FREQUENCY HARDENING]

[SHOT PEENING]

[SINGLE-LAYER COATING]

[MULTIPLE-LAYER COATING]

TORSIONAL VIBRATION DAMPER AND MANUFACTURING METHOD THEREOF

The present disclosure claims the benefit of Japanese Patent Application No. 2020-204714 filed on Dec. 10, 2020 with the Japanese Patent Office, the disclosure of which is incorporated herein by reference in its entirety.

BACKGROUND

Field of the Disclosure

Embodiments of the present disclosure relate to the art of a torsional vibration damper that reduces torsional vibrations resulting from a torque pulse, and a manufacturing method thereof.

Discussion of the Related Art

JP-A-2002-349682 describes a planetary carrier in which durability of support portions supporting pinion gears via pinion shafts is increased. According to the teachings of JP-A-2002-349682, in order to increase abrasion resistance of the shaft hole, a wall surface of the shaft hole is hardened by high-frequency induction heating through an induction heating coil inserted in the shaft hole.

In order to increase the abrasion resistance of mechanical parts such as the planetary carrier, it is effective to apply a hardening or quenching treatment to a portion to which a slide member comes into contact. That is, contact portions in a torsional vibration damper may also be hardened by applying hardening treatment thereto. The torsional vibration damper comprises: a disc-shaped rotary member; an annular-shaped inertia body serving as a weight; and a rolling mass serving as a connection member connecting the rotary member to the inertia body. The rotary member is joined to a predetermined rotary shaft to be rotated by a torque delivered to the rotary shaft. In the rotary member, a retainer is formed on an outer circumference of the rotary member to hold the rolling mass such that the rolling mass is restricted to oscillate in a circumferential direction but allowed to reciprocate in a radial direction. The inertia body is arranged coaxially around the rotary member while being allowed to rotate relatively to the rotary member, and a recess as an arcuate depression is formed on an inner circumference of the inertia body to hold the rolling mass therein. Specifically, a curvature radius of the recess is longer than a radius of the rolling mass, and a raceway surface to which the rolling mass comes into contact is formed on an inner circumference of the recess. In the torsional vibration damper, the rolling mass held in the retainer is centrifugally brought into contact to the raceway surface by a rotation of the rotary member, and oscillated along the raceway surface by pulsation of the torque of the rotary shaft.

Thus, the rolling mass reciprocates within the retainer of the inertia body while contacting to an inner surface of the retainer. Therefore, in order to prevent abrasion of the retainer, the inner surface of the retainer may be hardened by applying quenching treatment to the inner surface as taught by JP-A-2002-349682. However, when the rotary member is rotated at a high speed, the rolling mass comes into contact only to a radially outer portion of the inner surface of the retainer. In this situation, a load pushing the rolling mass onto the inner surface of the retainer is increased with an increase in a rotational speed of the rotary member, and only the radially outer portion of the inner surface of the retainer would be worn significantly. Consequently, a clearance between the retainer and the rolling mass would be increased, and hence a collision impact of the rolling mass applied to the inner surface of the retainer would be increased. As a result, the rolling mass may not be allowed to reciprocate smoothly within the retainer, and vibration damping performance of the torsional vibration damper would be reduced.

SUMMARY

Aspects of embodiments of the present disclosure have been conceived noting the foregoing technical problems, and it is therefore an object of the present disclosure to provide a torsional vibration damper having improved abrasion resistance at a portion of a rotary member to which a rolling mass is contacted, and a manufacturing method thereof.

According to one aspect of the present disclosure, there is a torsional vibration damper comprising: a rotary member that is rotated by torque transmitted thereto; an inertia body that is arranged coaxially with the rotary member while being allowed to oscillate relatively to the rotary member; a retainer having a pair of retainers protruding radially outwardly from an outer circumference of the rotary member; and a rolling mass that is held in the retainer to connect the rotary member to the inertia body while being allowed to reciprocate in a radial direction. In the torsional vibration damper, torque of the rotary member is transmitted to the inertia body through the rolling mass to damp torsional vibrations of the rotary member, and the pair of stoppers are opposed to each other in a circumferential direction of the rotary member so that the rolling mass is held between the stoppers. In order to achieve the above-explained objective, according to one aspect of the present disclosure, a hardness of an inner surface of at least one of the stoppers is increased higher in a radially outer portion than in a radially inner portion, within a reciprocating range of the rolling mass.

In a non-limiting embodiment, the hardness of the inner surface of the at least one of the stoppers may be increased gradually from the radially inner portion toward the radially outer portion, within the reciprocating range of the rolling mass.

In a non-limiting embodiment, the hardness of the inner surface of the at least one of the stoppers may be increased stepwise from the radially inner portion toward the radially outer portion, within the reciprocating range of the rolling mass.

In a non-limiting embodiment, the hardness of the inner surface of the at least one of the stoppers may be increased from the radially inner portion toward the radially outer portion by applying a high-frequency hardening or a shot peening to the inner surface, or forming a coating layer on the inner surface.

In a non-limiting embodiment, the harness of the radially outer portion of the inner surface is increased in both of the stoppers.

In a non-limiting embodiment, the rolling mass may comprise a shaft, and the shaft of the rolling mass may be held between the stoppers.

In a non-limiting embodiment, the rolling mass may further comprise a bearing that is fitted onto the shaft, and the rolling mass may be held in the retainer such that the bearing slides on the inner surfaces of the stoppers.

In a non-limiting embodiment, the inertia body may comprise a raceway surface formed on an inner circumference of the inertia body, to which the rolling mass is contacted by a centrifugal force.

In a non-limiting embodiment, predetermined clearances may be maintained on both sides of the rolling member in the circumferential direction from the inner surfaces of the stoppers so that the rolling mass is isolated away from one of the inner surfaces of the stoppers when coming into contact to the other one of the inner surfaces.

According to another aspect of the present disclosure, there is provided to a manufacturing method of the above-explained torsional vibration damper. In order to achieve the above-explained objective, according to another aspect of the present disclosure, the manufacturing method comprises: applying a surface treatment to an inner surface of at least one of the stoppers within a reciprocating range of the rolling mass, thereby increasing a hardness of a radially outer portion of the inner surface higher than a hardness of a radially inner portion thereof.

In the torsional vibration damper according to the present disclosure, the bearing of the rolling mass comes into contact to the radially outer portions of the inner surfaces of the retainer in most situations during rotation of the rotary member. In this situation, the rolling mass is oscillated in the circumferential direction by pulsation of the torque applied to the rotary member along the raceway surface of the inertia body, while reciprocating in the radial direction between the stoppers of the retainer within the radially upper region. In other words, the bearing of the rolling mass comes into contact to the radially inner portions of the stoppers less frequently only when the rotary member is rotated at a low speed and hence the centrifugal force is weak. In the torsional vibration damper according to the present disclosure, therefore, the hardness of the inner surface of at least one of the stoppers is increased higher in the radially outer portion than in the radially inner portion. For this reason, the inner surface of the stopper in which the hardness of the radially outer portion is increased will be worn by the bearing of the rolling mass entirely homogeneously from the radially inner portion to the radially outer portion. That is, the radially outer portion of at least one of the inner surfaces of the retainer will not be worn locally.

Whereas, since the bearing of the rolling mass comes into contact to the radially inner portions of the retainer less frequently, the radially inner portions of the stoppers will not be worn significantly, even if it is not be hardened. According to the present disclosure, therefore, flatness of the inner surfaces of the retainer may be maintained for long periods of time. That is, the inner surfaces of the retainer will not be worn locally or unevenly. For this reason, the rolling mass is allowed to reciprocate smoothly between the inner surfaces of the retainer, and hence vibration damping performance of the damper can be ensured.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
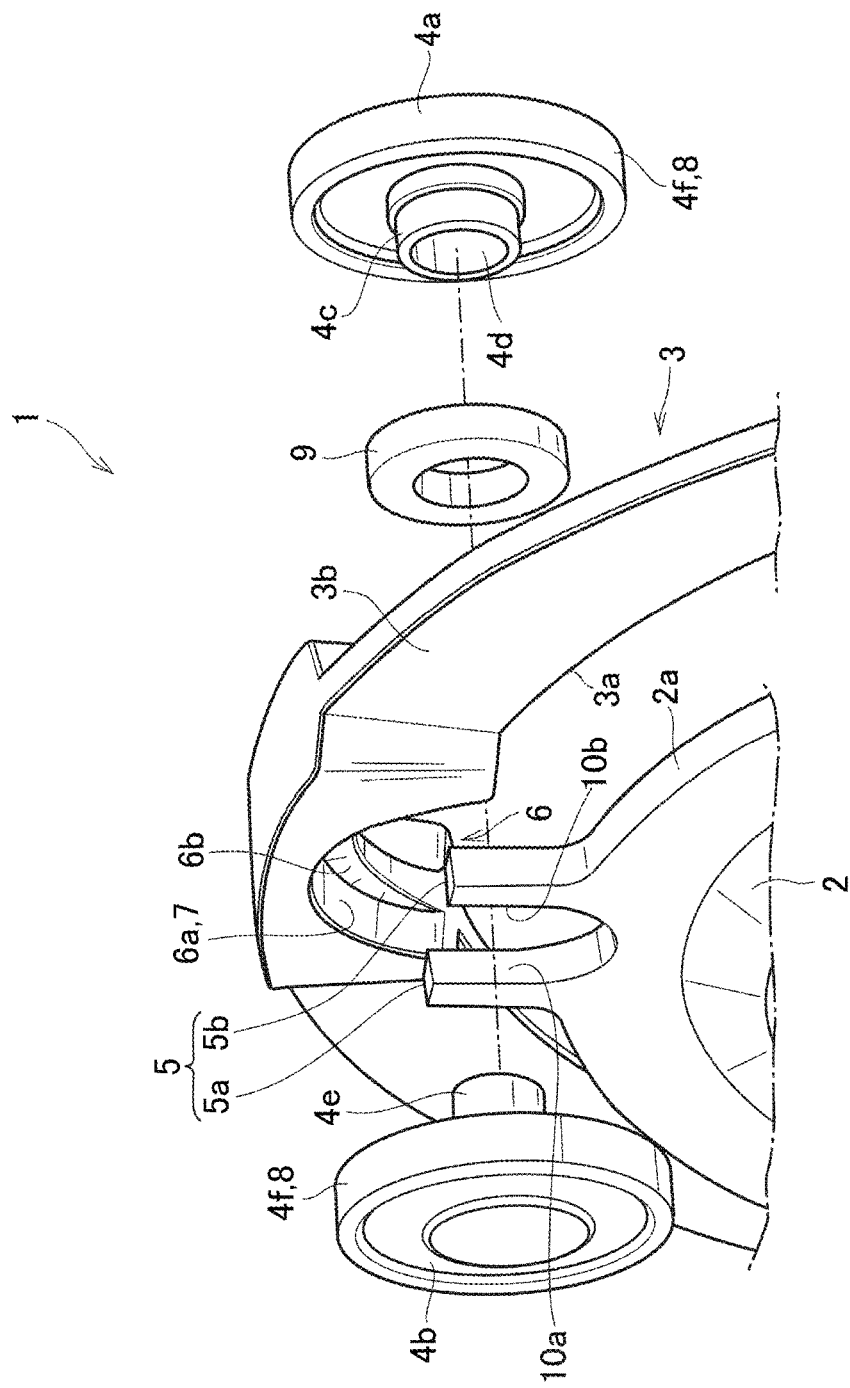
FIG. 1 is an exploded perspective view showing constitutional elements of the torsional vibration damper according to exemplary embodiment of the present disclosure.

Embodiments of the present disclosure will now be explained with reference to the accompanying drawings. Note that the embodiments shown below are merely examples of the present disclosure which should not limit a scope of the present disclosure.

Here will be explained a fundamental structure of the torsional vibration damper according to the exemplary embodiment of the present disclosure with reference to FIG. 1. The torsional vibration damper (as will be simply called the "damper" hereinafter) 1 comprises a rotary member 2, an inertia body 3, a rolling mass 4, a retainer 5, and a recess 6.

In the damper 1, the rotary member 2 is rotated by a torque applied thereto, and the torque is pulsated inevitably e.g., by a combustion in an internal combustion engine. The inertia body 3 is connected to the rotary member 2 though a plurality of the rolling masses 4 so that the inertia body 3 is oscillated relatively to the rotary member 2 by the pulsation of the torque applied to the rotary member 2.

Specifically, the rotary member 2 as a circular plate member having a center hole is mounted on a predetermined shaft such as an output shaft of the engine or an input shaft of a transmission so that the rotary member 2 is rotated integrally therewith. A plurality of the retainers 5 are formed on an outer circumference 2a of the rotary member 2, and the rolling mass 4 is held in each of the retainers 5.

The inertia body 3 is an annular plate member having a predetermined mass, and the inertia body 3 is arranged coaxially around the rotary member 2 while being allowed to oscillate relatively to the rotary member 2. A plurality of raceway surfaces 7 are formed on an inner circumference 3a of the inertia body 3, and the inertia body 3 is supported by the rolling masses 4 each of which is held between the retainer 5 and a recess 6 of the raceway surface 7.

Each of the rolling mass 4 serves as a centrifugal roller having a predetermined mass. That is, the rotary member 2 is connected to the inertia body 3 through the rolling masses 4. Specifically, each of the rolling masses 4 is held in the retainer 5 of the rotary member 2 while being allowed to rotate and to reciprocate in a radial direction so that each of the rolling masses 4 is centrifugally pushed onto the raceway surface 7 of the inertia body 3 when the rotary member 2 is rotated. Consequently, the torque of the rotary member 2 is transmitted to the inertia body 3 through the rolling masses 4. According to the exemplary embodiment of the present disclosure, as illustrated in FIGS. 1 and 2, the rotary member 2 has a two-part structure including a first mass 4a and a second mass 4b so that the rolling mass 4 may be assembled easily with the rotary member 2 and the inertia body 3.

The first mass 4a is a pulley member comprising a boss 4c formed on a center of the first mass 4a, a shaft hole 4d formed in the boss 4c, and an outer circumferential surface 4f serving as a contact surface 8 contacted to the raceway surface 7. In addition, a bearing 9 as a ball bearing or a slide bearing (i.e., a bush) is fitted onto the boss 4c so that the rolling mass 4 is allowed to rotate smoothly in the retainer 5 and roll on the raceway surface 7. Instead, an outer circumferential surface of the boss 4c of the rolling mass 4 may be adapted to serve as a slide bearing to omit the bearing 9.

The second mass 4b is also a pulley member comprising a shaft 4e formed on a center of the second mass 4b, and an outer circumferential surface 4f serving as a contact surface 8 contacted to the raceway surface 7. The shaft 4e of the second mass 4b is tightly inserted into the shaft hole 4d of the first mass 4a so that the second mass 4b is combined with the first mass 4a to form the rolling mass 4.

Specifically, the shaft 4e of the second mass 4b is inserted into the shaft hole 4d of the first mass 4a in such a manner that the bearing 9 is held in the retainer 5 and that the first mass 4a and the second mass 4b are held in the recess 6 of the raceway surface 7. Consequently, the rolling mass 4 is engaged with the retainer 5 of the rotary member 2, and the rotary member 2 is connected to the inertia body 3 through the rolling mass 4. According to the exemplary embodiment of the present disclosure, three rolling masses 4 are arranged in the damper 1. Accordingly, three retainers 5 are formed on the rotary member 2 at regular intervals and three raceway surfaces 7 are formed on the inertia body 3 at regular intervals.

Figure 2:
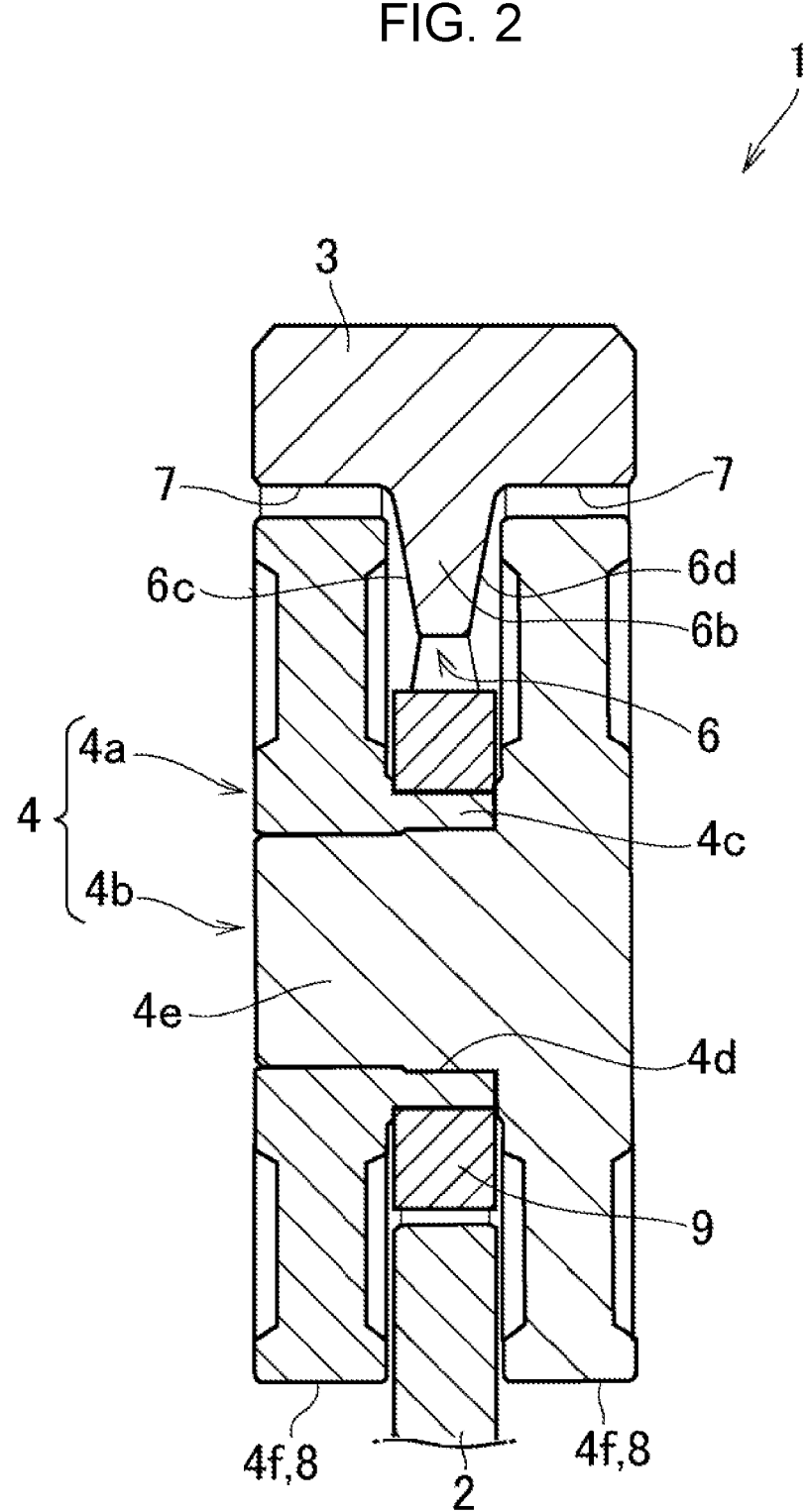
FIG. 2 is a partial cross-sectional view partially showing a cross-section the torsional vibration damper shown in FIG. 1.

As illustrated in FIGS. 1 to. 3, each of the retainers 5 comprises a pair of column-shaped stoppers 5a and 5b extending radially outwardly from the outer circumference 2a of the rotary member 2, and in parallel to each other.

Specifically, the bearing 9 fitted onto the boss 4c of the rolling mass 4 is held between the stoppers 5a and 5b of the retainer 5, and hence an oscillation of the rolling mass 4 in the circumferential direction is restricted by the stoppers 5a and 5b. A length of each of the stoppers 5a and 5b is individually longer than an outer diameter of the bearing 9, and a clearance between an inner surface 10a of the stopper 5a and an inner surface 10b of the stopper 5b is slightly wider than the outer diameter of the bearing 9. Therefore, the bearing 9 of the rolling mass 4 is allowed to slide on the inner surface 10a and the inner surface 10b so that the rolling mass 4 is allowed to reciprocate in the radial direction between the stoppers 5a and 5b.

Accordingly, when the rotary member 2 is rotated, the rolling masses 4 revolve around the rotational center axis of the rotary member 2 while being displaced radially outwardly by a centrifugal force.

The recess 6 as an arcuate depression is formed by depressing the inner circumference 3a of the inertia body 3 radially outwardly, and a curvature radius of the recess 6 is longer than a curvature radius of the outer circumferential surface 4f as the contact surface 8 of the rolling mass 4. An inner circumferential surface 6a of the recess 6 serves as the above-mentioned raceway surface 7 to which the outer circumferential surface 4f as the contact surface 8 of the rolling mass 4 is centrifugally contacted, and the rolling mass 4 oscillates within the raceway surface 7. The raceway surface 7 is formed on both sides of a base portion 3b of the inertia body 3, and hence a total thickness of the pair of raceway surface 7 in the axial direction is thicker than a thickness of the base portion 3b of the inertia body 3 in the axial direction. In other words, the recess 6 is formed on both sides of the base portion 3b of the inertia body 3.

Figure 3:
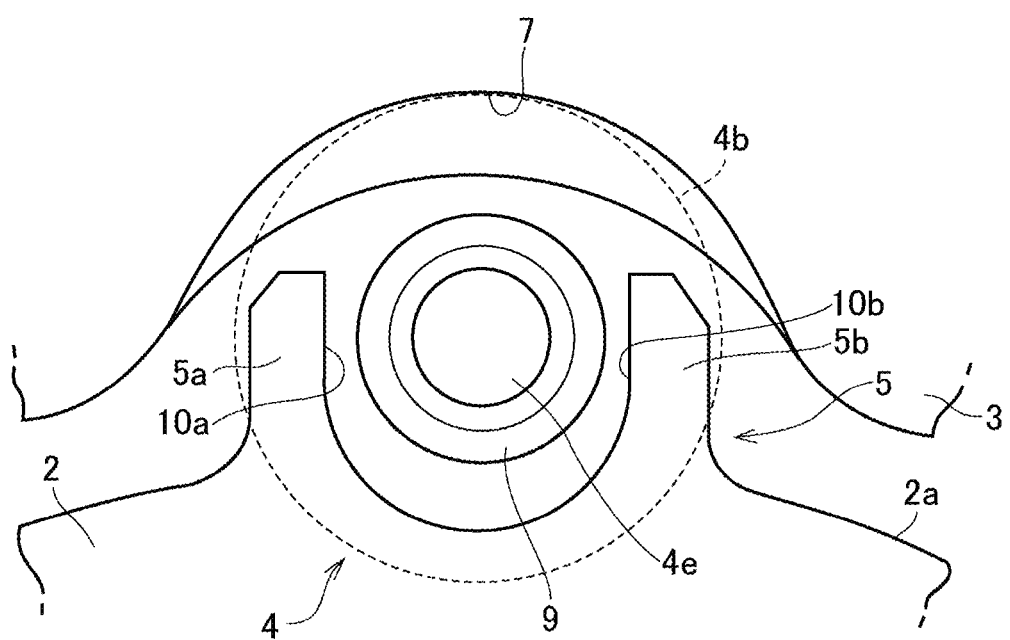
FIG. 3 is a partial enlarged view showing positions of a raceway surface, a rolling mass, and a retainer.

That is, a curvature radius of the raceway surface 7 is longer than a radius of the rolling mass 4 between a rotational center of the rolling mass 4 and the contact surface 8. However, the curvature radius of the raceway surface 7 is shorter than a radius of the rotary member 2 between the rotational center axis and the outer circumference 2a, and a radius of the inertia body 3 between the rotational center axis and the inner circumference 3a. In the situation illustrated in FIG. 3, the contact surface 8 of the rolling mass 4 is contacted to an intermediate portion of the raceway surface 7 in the circumferential direction farthest from the rotational center of the inertia body 3. That is, the rolling mass 4 is situated at a neutral position. In this situation, the bearing 9 fitted onto the boss 4c of the rolling mass 4 is not contacted to any of the inner surface 10a of the stopper 5a and the inner surface 10b of the stopper 5b. In other words, predetermined clearances are maintained on both sides of the bearing 9 of the rolling mass 4 in the circumferential direction from the inner surface 10a of the stopper 5a and the inner surface 10b of the stopper 5b. Then, when the rolling mass is oscillated in one of the circumferential directions, the rolling mass 4 is pushed back radially inwardly by the raceway surface 7, and eventually comes into contact to one of the inner surface 10a of the stopper 5a and the inner surface 10b of the stopper 5b. Consequently, the clearance between the bearing 9 of the rolling mass 4 and the other one of the inner surface 10a of the stopper 5a and the inner surface 10b of the stopper 5b is increased.

As described, each of the outer circumferential surfaces 4f of the first mass 4a and the second mass 4b serves as the contact surface 8. Therefore, the raceway surface 7 is formed on both sides of the base portion 3b of the inertia body 3 in the axial direction to receive the contact surfaces 8 of the rolling mass 4, and an aligning rib 6b is formed on the inertia body 3 between the pair of raceway surfaces 7.

As illustrated in FIG. 2, the aligning rib 6b as a plate section protrudes radially inwardly from a width center of the recess 6 toward the rotational center axis, so that the aligning rib 6b is interposed between the first mass 4a and the second mass 4b to align a relative position of the rolling mass 4 with respect to the recess 6. To this end, the aligning rib 6b comprises an inclined surface 6c opposed to the first mass 4a and an inclined surface 6d opposed to the second mass 4b, and the inclined surface 6c and the inclined surface 6d are inclined such that a thickness of the aligning rib 6b is reduced toward the rotational center axis of the inertia body 3. That is, the thickness of the aligning rib 6b between the inclined surface 6c and the inclined surface 6d is thickest at a radially outermost portion, and the thickness of the aligning rib 6b at the radially outermost portion is substantially identical to a clearance between the first mass 4a and the second mass 4b in the axial direction. When the rotary member 2 is rotated, the rolling mass 4 is centrifugally displaced radially outwardly toward the raceway surface 7. In this situation, a clearance between the first mass 4a and the inclined surface 6c, and a clearance between the second mass 4b and the inclined surface 6d are reduced gradually. Eventually, the contact surface 8 of the rolling mass 4 comes into contact to the raceway surface 7, and in this situation, the above-mentioned clearances between the rolling mass 4 and the aligning rib 6b are reduced to zero. As a result, the rolling mass 4 is aligned in the recess 6 with the inertia body 3 and the rotary member 2 in the axial direction.

When the rotary member 2 is rotated by a torque applied thereto, the rolling masses 4 held in the retainers 5 revolves around the rotational center axis of the rotary member 2 while being subjected to the centrifugal force in accordance with a distance from the rotational center axis. The centrifugal force is increased with an increase in a rotational speed of the rotary member 2, and when the centrifugal force exceeds the gravitational force, the rolling masses 4 are displaced radially outwardly between stoppers 5a and 5b of the retainers 5. Eventually, when the rotational speed of the rotary member 2 is increased to a predetermined level, the rolling masses 4 are centrifugally pushed onto the raceway surfaces 7 of the inertia body 3. Consequently, the rotary member 2 and the inertia body 3 are connected to each other through the rolling masses 4. In this situation, if the torque is not pulsated, pulsation of the torque is rather small, or the rotational speed of the rotary member 2 is significantly high, each of the rolling masses 4 individually transmits the torque of the rotary member 2 to the inertia body 3 without oscillating on the raceway surface 7. As a result, the rotary member 2 and the inertia body 3 are rotated integrally. In other words, the damper 1 is rotated integrally.

When the torque applied to the rotary member 2 is pulsated, an angular acceleration of the rotary member 2 is changed, and consequently the inertia body 3 is oscillated relatively to the rotary member 2 by an inertia force. In this situation, each of the rolling masses 4 rolls on the raceway surface 7. As described, since the curvature radius of the raceway surface 7 is shorter than the curvature radius of the inner circumference of the inertia body 3, the rolling mass 4 is pushed back radially inwardly the raceway surface 7, as the rolling mass 4 approaches a circumferential end of the raceway surface 7. Consequently, the rolling mass 4 is centrifugally displaced radially outwardly again, and a component of force resulting from such displacement of the rolling mass 4 is applied to the inertia body 3 in the direction to bring the rolling mass 4 into contact to the intermediate position in the raceway surface 7. As a result, the inertia body 3 is oscillated relatively to the rotary member 2. That is, the inertia body 3 is oscillated relatively to the rotary member 2 by the pulsation of the torque applied to the rotary member 2. As described, the rolling masses 4 are restricted to oscillate in the circumferential direction but allowed to reciprocate in the radial direction. Therefore, a reaction force of the rotary member 2 acting in the circumferential direction resulting from the oscillating motion of the inertia body 3 serves as a vibration damping torque to damp the torsional vibrations on the rotary member 2. Specifically, the pulsation of the torque of the rotary member 2 is transmitted to the inertia body 3 through the rolling masses 4, and the inertia body 3 is oscillated in the opposite direction to the rotational direction of the rotary member 2. Consequently, vibrations of the rotary member 2 resulting from the pulsation of the torque applied thereto is damped by the inertia moment of the inertia body 3. Thus, the vibrations of the rotary member 2 resulting from torque pulse may be damped effectively by the damper 1 according to the embodiment of the present disclosure.

Figure 4:
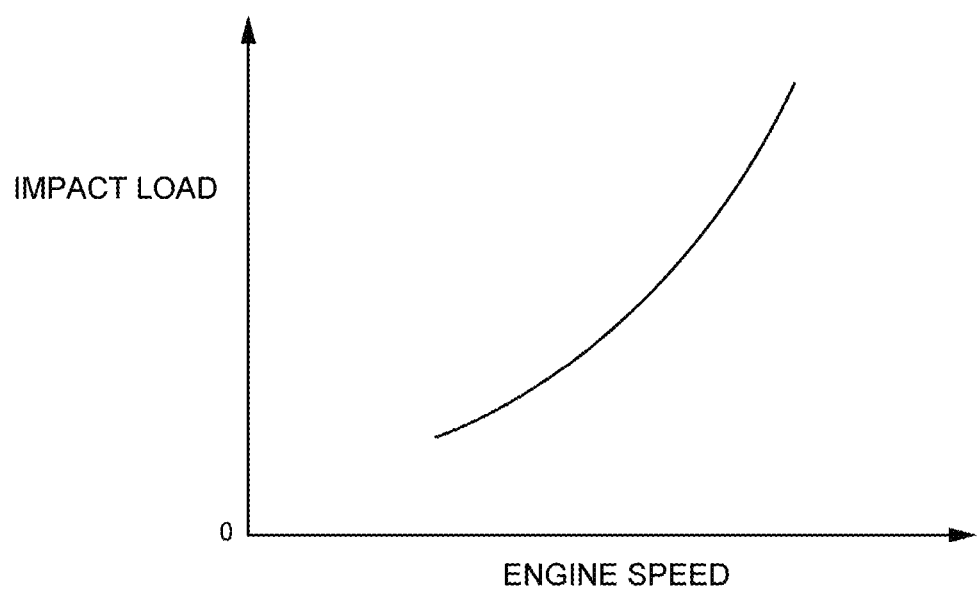
FIG. 4 is a graph indicating a relation between an impact load applied to an inner surface of the retainer from the rolling mass and a speed of an engine.
Figure 5:
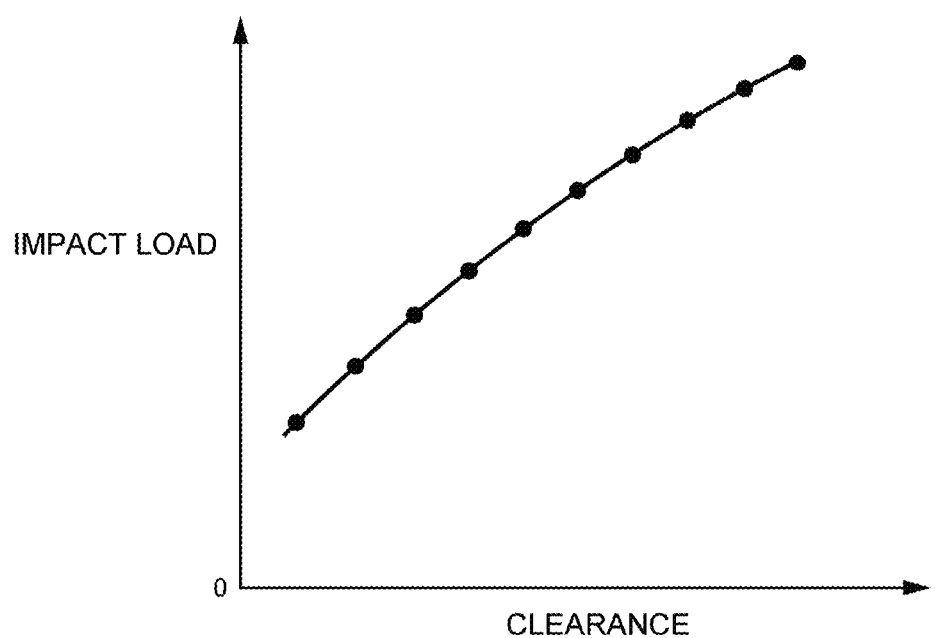
FIG. 5 is a graph indicating a relation between the impact load applied to the inner surface of the retainer from the rolling mass and a clearance between a bearing of the rolling mass and the inner surface of the retainer.
Figure 6:
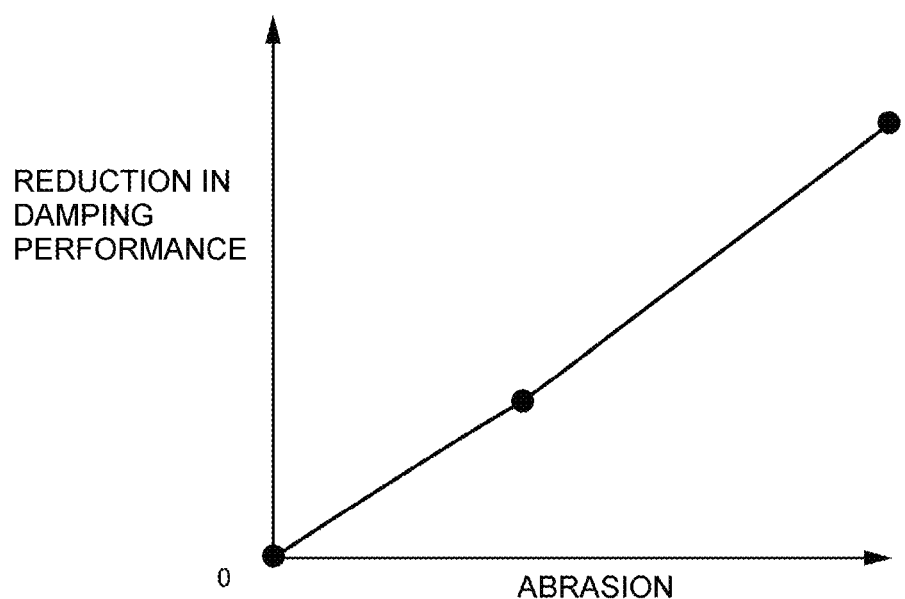
FIG. 6 is a graph indicating a relation between vibration damping performance of the torsional vibration damper and abrasion of the inner surface of the retainer.

Thus, during rotation of the rotary member 2, the rolling mass 4 is reciprocated in the radial direction within the retainer 5, and centrifugally pushed onto the raceway surface 7 of the inertia body 3 in most situations. That is, given that the rotary member 2 is rotated at a high speed, the bearing 9 of the rolling mass 4 comes into contact to radially outer portions of the inner surface 10a and inner surface 10b of the retainer 5 in most situations. Consequently, only the radially outer portions of the inner surface 10a and the inner surface 10b of the retainer 5 would become worn, and the clearance between the bearing 9 and the inner surface 10a and the clearance between the bearing 9 and the inner surface 10b would be partially widened at the radially outer portions. If the clearances between the bearing 9 and the inner surface 10a and between the bearing 9 and the inner surface 10b are widened, a collision impact of the bearing 9 against the inner surfaces 10a and 10b would be increased. In addition, if the inner surface 10a and the inner surface 10b are locally worn at the radially outer portions, sliding resistances on the inner surface 10a and the inner surface 10b would be increased by dents formed on the radially outer portions thereof. As a result, the rolling mass 4 cannot reciprocate smoothly in the radial direction within the retainer 5, and vibration damping performance of the damper 1 would be reduced. For example, as shown in FIG. 4, an impact load applied to the inner surfaces 10a or 10b of the retainer 5 from the rolling mass 4 increases with an increase in a speed of the engine. In addition, as shown in FIG. 5, an impact load applied to the inner surfaces 10a or 10b of the retainer 5 from the rolling mass 4 also increases with an increase in the clearance between the bearing 9 and the inner surface 10a or 10b. Consequently, as shown in FIG. 6, the vibration damping performance of the damper 1 is reduced with an increase in abrasion of the inner surface 10a or 10b of the retainer 5. In order to avoid such reduction in the vibration damping performance of the damper 1, according to the exemplary embodiment of the present disclosure, abrasion resistance of at least one of the inner surface 10a and inner surface 10b of the retainer 5 is improved at the radially outer portion, thereby maintaining the clearances between the bearing 9 and the inner surface 10a or 10b entirely homogeneously in the redial direction.

Figure 7:
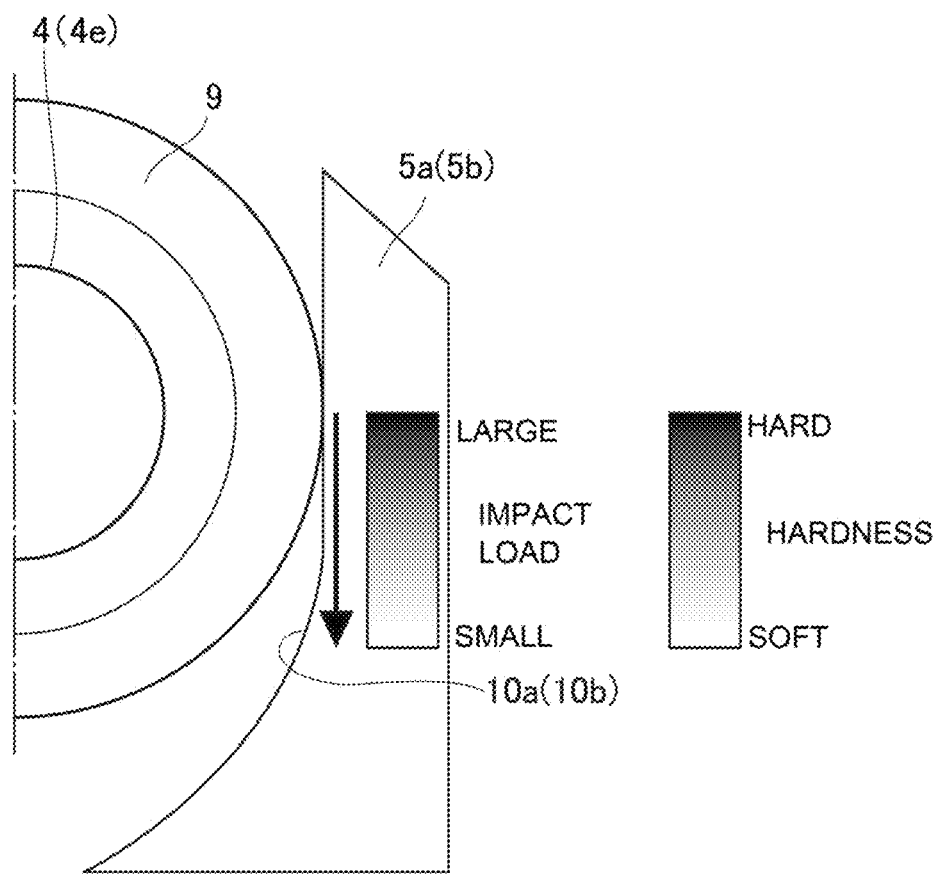
FIG. 7 is an explanation drawing showing a difference in a hardness of the inner surface of the retainer that is locally increased by a surface treatment.
Figure 8A:
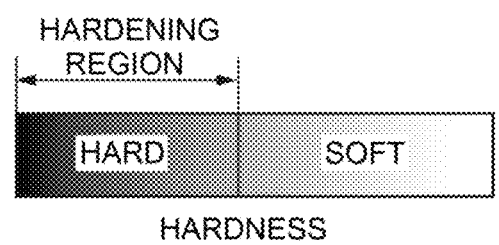
FIG. 8A is a graph indicating a region of the inner surface of the retainer to which a high-frequency hardening is applied.
Figure 8B:
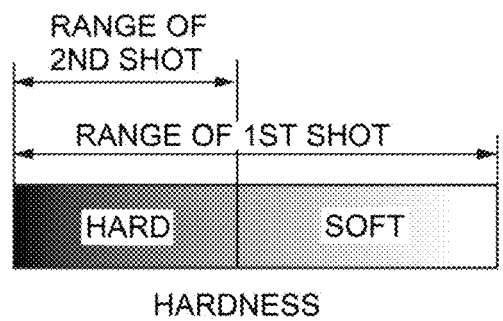
FIG. 8B is a graph indicating regions of the inner surface of the retainer to which a shot peening is applied.

Specifically, as shown in FIGS. 7, 8A, and 8B, hardness of at least one of the stopper 5a and the stopper 5b is increased higher in the radially outer portion than in the radially inner portion. That is, a hardened surface is formed on the radially outer portion of at least one of the inner surface 10a of the stopper 5a and the inner surface 10b of the stopper 5b within a reciprocating range of the bearing 9 of the rolling mass 4. For this purpose, a predetermined surface treatment is applied to at least one of the inner surface 10a of the stopper 5a and the inner surface 10b of the stopper 5b within the reciprocating range of the bearing 9 of the rolling mass 4. For example, the hardness of the stopper 5a or 5b may be increased by a high-frequency hardening. In this case, as indicated in FIG. 8A, only a portion to be hardened is heated to improve abrasion resistance or fatigue endurance. To this end, for example, a coil is set around the portion of the stopper 5a or 5b to be hardened, and the portion of the stopper 5a or 5b to be hardened is heated by eddy current derived from a magnetic force established by carrying high-frequency induced current through the coil for a predetermined short period of time.

As indicated in FIG. 7, the hardness of the inner surface 10a or 10b of the stopper 5a or 5b is increased gradually from the radially inner portion toward the radially outer portion. Otherwise, the hardness of the inner surface 10a or 10b of the stopper 5a or 5b may also be increased stepwise from the radially inner portion toward the radially outer portion. In order to equalize the clearances between the bearing 9 and the inner surface 10a and between the bearing 9 and the inner surface 10b, it is preferable to apply the hardening treatment to both of the stoppers 5a and 5b.

Instead, the hardness of the inner surface 10a or 10b of the stopper 5a or 5b may also be increased by a shot peening. In this case, the inner surface 10a or 10b of the stopper 5a or 5b is smoothened by impacting the inner surface 10a or 10b with shot (e.g., round metallic). Consequently, the inner surface 10a or 10b of the stopper 5a or 5b is hardened by work-hardening of the inner surface 10a or 10b resulting from plastic deformation, homogenization of stress on the inner surface 10a or 10b, and compressive residual stress on the inner surface 10a or 10b. For this purpose, the shot may be selected from grains whose diameter falls within a range of 0.2 mm to 1.2 mm. A shot velocity and an exposure time may be adjusted according to a required surface roughness and hardness of the inner surface 10a or 10b.

The hardness of the inner surface 10a or 10b of the stopper 5a or 5b may be further increased by applying the shot peening to the inner surface 10a or 10b two times. In this case, as indicated in FIG. 8B, the first shot is applied entirely to the inner surface 10a or 10b of the stopper 5a or 5b, and a fine particle peening is further applied only to the radially outer portion of the inner surface 10a or 10b to be hardened as the second shot. In the second shot, specifically, shot whose diameter is smaller than 0.2 mm is used, and a shot velocity is higher compared to the normal shot peening. Optionally, in order to achieve the required hardness, the high-frequency hardening may also be applied to the inner surface 10a or 10b of the stopper 5a or 5b in addition to the shot peening.

Figure 9:
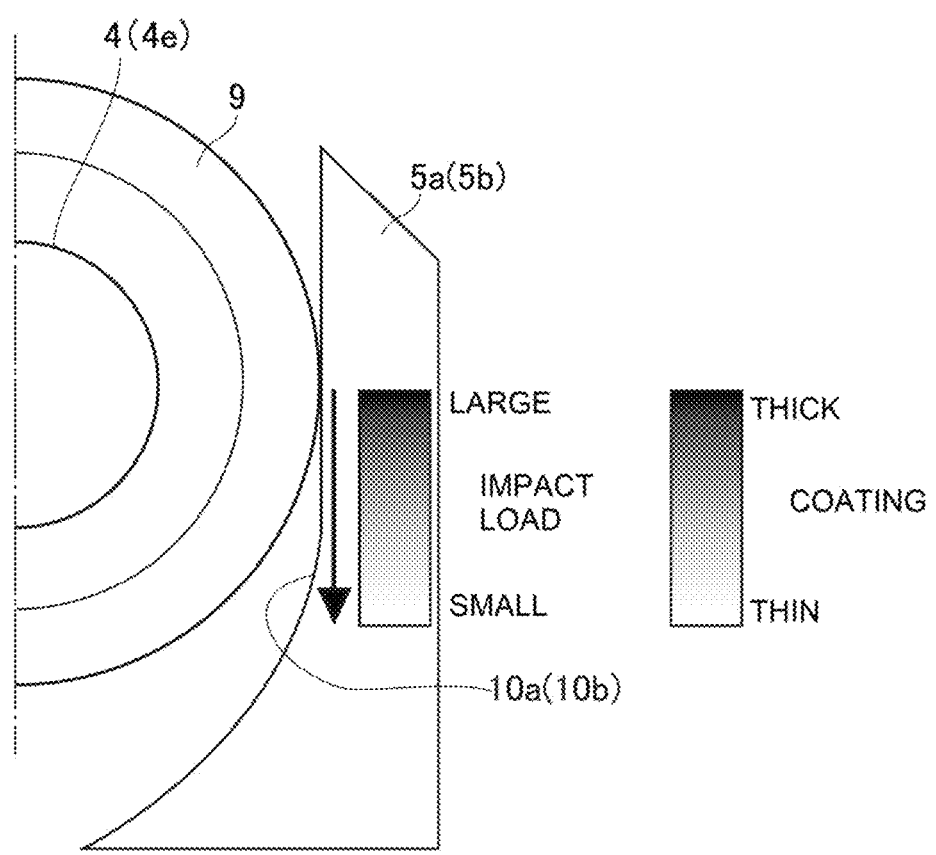
FIG. 9 is an explanation drawing showing a difference in a hardness of the inner surface of the retainer that is locally increased by forming a coating layer thereon.
Figure 10A:
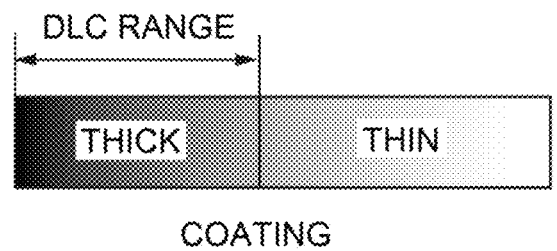
FIG. 10A is a is a graph indicating a region of the inner surface of the retainer on which a coating layer is formed.
Figure 10B:
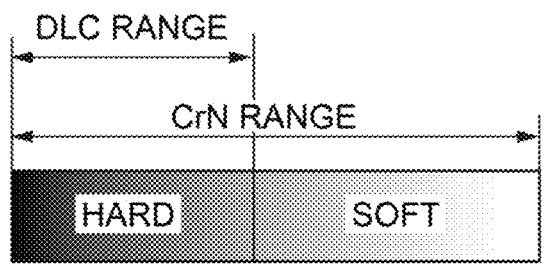
FIG. 10B is a graph indicating regions of the inner surface of the retainer on which different coating layers are formed.

Instead, the hardness of the inner surface 10a or 10b of the stopper 5a or 5b may also be increased by a coating treatment. In this case, as indicated in FIGS. 9, 10A, and 10B, the radially outer portion of the inner surface 10a or 10b is coated to increase the hardness thereof. For example, DLC (i.e., Diamond-Like-Coating) may be employed as the coating, and a thickness of the coating is increased gradually from the radially inner portion toward the radially outer portion. Specifically, the hardness of the DLC is high, but the friction coefficient of the DLC is low. In this case, therefore, the inner surface 10a or 10b of the stopper 5a or 5b may be coated with a thin coating having excellent abrasion resistance.

Instead, the thickness of the coating may also be increased stepwise from the radially inner portion toward the radially outer portion. As the foregoing examples, in order to equalize the clearances between the bearing 9 and the inner surface 10a and between the bearing 9 and the inner surface 10b, it is preferable to form the coating on both of the inner surfaces 10a and 10b of the stoppers 5a and 5b.

In order to further increase the hardness of the inner surface 10a or 10b of the stopper 5a or 5b, as indicated in FIG. 10B, the inner surface 10a or 10b may be coated with a plurality of layers of the coating. In this case, for example, the inner surface 10a or 10b of the stopper 5a or 5b is coated entirely with a CrN (i.e., a Chromium nitride) coating as a base layer, and the radially outer portion of the inner surface 10a or 10b is further coated with the DLC as a top layer. Specifically, the CrN coating has an excellent abrasion resistance, and in addition, adhesion resistance and smoothness of the CrN coating are also excellent. In this case, therefore, the inner surface 10a or 10b of the stopper 5a or 5b may be coated with a thin and smooth first layer having sufficient hardness. Thus, according to the exemplary embodiment of the present disclosure, the hardness of the radially outer portion of at least one of the stopper 5a and the stopper 5b is increased by any of the above-explained treatments.

As described, during rotation of the rotary member 2, the bearing 9 of the rolling mass 4 comes into contact to the radially outer portions of the inner surface 10a of the stopper 5a and the inner surface 10b of the stopper 5b in most situations. In such situation, the rolling mass 4 is oscillated in the circumferential direction by the pulsation of the torque applied to the rotary member 2 along the raceway surface 7 of the inertia body 3, while reciprocating in the radial direction between the stoppers 5a and 5b of the rotary member 2 within the radially upper region. In other words, the bearing 9 of the rolling mass 4 comes into contact to the radially inner portions of the stoppers 5a and 5b less frequently only when the rotary member 2 is rotated at a low speed and hence the centrifugal force is weak. In the damper 1 according to the exemplary embodiment of the present disclosure, therefore, the hardness of at least one of the stopper 5a and the stopper 5b is increased higher in the radially outer portion than in the radially inner portion. For this reason, the inner surface 10a or 10b of the stopper 5a or 5b in which the hardness of the radially outer portion is increased will be worn by the bearing 9 of the rolling mass 4 entirely homogeneously from the radially inner portion to the radially outer portion. That is, the radially outer portion of at least one of the inner surfaces 10a and 10b of the stoppers 5a and 5b will not be worn locally.

Whereas, since the bearing 9 of the rolling mass 4 comes into contact to the radially inner portions of the stoppers 5a and 5b less frequently, the radially inner portions of the stoppers 5a and 5b will not be worn significantly, even if it is not be hardened. According to the exemplary embodiment of the present disclosure, therefore, flatness of the inner surface 10a or 10b of the stopper 5a or 5b may be maintained for long periods of time. That is, the inner surface 10a or 10b of the stopper 5a or 5b will not be worn locally or unevenly. For this reason, the rolling mass 4 is allowed to reciprocate smoothly between the inner surfaces 10a and 10b of the retainer 5.

In addition, since the clearances between the bearing 9 and the inner surface 10a and between the bearing 9 and the inner surface 10b can be maintained evenly, it is possible to prevent an increase in the impact load applied to the inner surfaces 10a and 10b of the retainer 5 from the rolling mass 4. In other words, damages of the stoppers 5a and 5b of the retainer 5 can be limited. Further, since the rolling mass 4 is allowed to reciprocate smoothly between the inner surfaces 10a and 10b of the retainer 5, vibration damping performance of the damper 1 can be ensured.

Although the above exemplary embodiments of the present disclosure have been described, it will be understood by those skilled in the art that the present disclosure should not be limited to the described exemplary embodiments, and various changes and modifications can be made within the scope of the present disclosure. For example, the hardness of the stoppers 5a and 5b may also be increased by other means such as a laser hardening.

What is claimed is:

1. A torsional vibration damper comprising:
a rotary member that is rotated by torque transmitted thereto;
an inertia body that is arranged coaxially with the rotary member while being allowed to oscillate relatively to the rotary member;
a retainer having a pair of stoppers protruding radially outwardly from an outer circumference of the rotary member; and
a rolling mass that is held in the retainer to connect the rotary member to the inertia body while being allowed to reciprocate in a radial direction,
wherein torque of the rotary member is transmitted to the inertia body through the rolling mass to damp torsional vibrations of the rotary member,
the pair of stoppers are opposed to each other in a circumferential direction of the rotary member so that the rolling mass is held between the stoppers, and
a hardness of an inner surface of at least one of the stoppers is increased higher in a radially outer portion than in a radially inner portion, within a reciprocating range of the rolling mass.

2. The torsional vibration damper as claimed in claim 1, wherein the hardness of the inner surface of the at least one of the stoppers is increased gradually from the radially inner portion toward the radially outer portion, within the reciprocating range of the rolling mass.

3. The torsional vibration damper as claimed in claim 1, wherein the hardness of the inner surface of the at least one of the stoppers is increased stepwise from the radially inner portion toward the radially outer portion, within the reciprocating range of the rolling mass.

4. The torsional vibration damper as claimed in claim 1, wherein the hardness of the inner surface of the at least one of the stoppers is increased from the radially inner portion toward the radially outer portion by applying a high-frequency hardening or a shot peening to the inner surface, or forming a coating layer on the inner surface.

5. The torsional vibration damper as claimed in claim 4, wherein the hardness of the radially outer portion of the inner surface is increased in both of the stoppers.

6. The torsional vibration damper as claimed in claim 1, wherein the rolling mass comprises a shaft, and
the shaft of the rolling mass is held between the stoppers.

7. The torsional vibration damper as claimed in claim 6, wherein the rolling mass further comprises a bearing that is fitted onto the shaft, and
the rolling mass is held in the retainer such that the bearing slides on the inner surfaces of the stoppers.

8. The torsional vibration damper as claimed in claim 1, wherein the inertia body comprises a raceway surface formed on an inner circumference of the inertia body, to which the rolling mass is contacted by a centrifugal force.

9. The torsional vibration damper as claimed in claim 1, wherein predetermined clearances are maintained on both sides of the rolling member in the circumferential direction from the inner surfaces of the stoppers so that the rolling mass is isolated away from one of the inner surfaces of the stoppers when coming into contact to the other one of the inner surfaces.

10. A manufacturing method of a torsional vibration damper, comprising:
a rotary member that is rotated by torque transmitted thereto;
an inertia body that is arranged coaxially with the rotary member while being allowed to oscillate relatively to the rotary member;
a retainer that protrudes radially outwardly from an outer circumference of the rotary member; and
a rolling mass that is held in the retainer to connect the rotary member to the inertia body while being allowed to reciprocate in a radial direction,
wherein torque of the rotary member is transmitted to the inertia body through the rolling mass to damp torsional vibrations of the rotary member, and
the retainer includes a pair of stoppers being opposed to each other in a circumferential direction of the rotary member so that the rolling mass is held between the stoppers,
the manufacturing method comprising:
applying a surface treatment to an inner surface of at least one of the stoppers within a reciprocating range of the rolling mass, thereby increasing a hardness of a radially outer portion of the inner surface higher than a hardness of a radially inner portion thereof.

11. The manufacturing method of a torsional vibration damper as claimed in claim 10, wherein the surface treatment includes a high-frequency hardening, a shot peening, and a forming of a coating layer.

* * * * *